A. E. DOMAN.
THERMO ELECTRIC SWITCH.
APPLICATION FILED AUG. 2, 1918.
1,347,686.
Patented July 27, 1920.
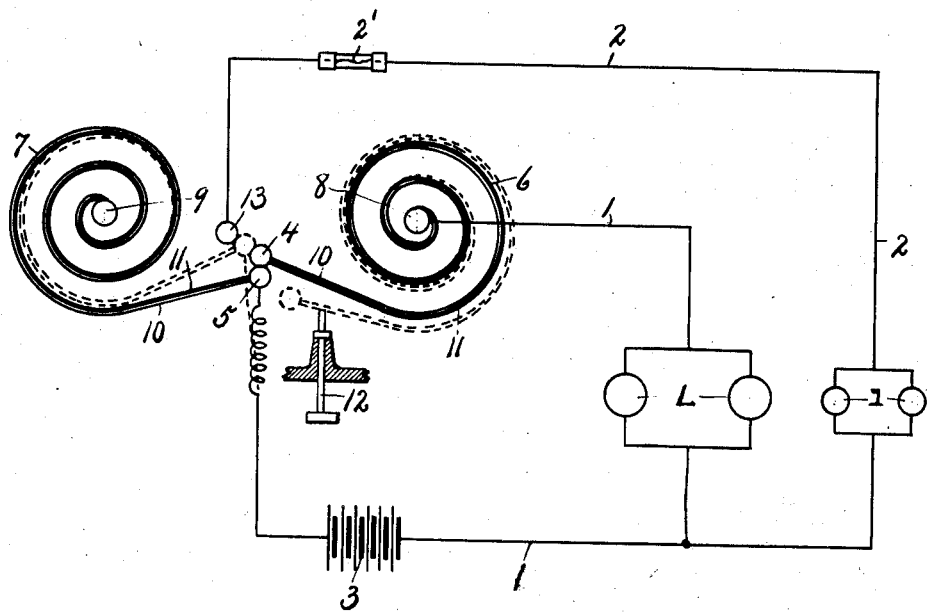
INVENTOR
A. E. Doman
BY
Howard P Denison
ATTORNEY

UNITED STATES PATENT OFFICE.

ALBERT E. DOMAN, OF ELBRIDGE, NEW YORK, ASSIGNOR TO DYNETO ELECTRIC CORPORATION, OF SYRACUSE, NEW YORK, A CORPORATION OF NEW YORK.

THERMO-ELECTRIC SWITCH.

1,347,686.   Specification of Letters Patent.   Patented July 27, 1920.

Application filed August 2, 1918. Serial No. 247,918.

*To all whom it may concern:*

Be it known that I, ALBERT E. DOMAN, a citizen of the United States of America, of Elbridge, in the county of Onondaga, in the State of New York, have invented new and useful Improvements in Thermo-Electric Switches, of which the following, taken in connection with the accompanying drawings, is a full, clear, and exact description.

This invention relates to certain improvements in thermo electric switches adapted to be used in connection with the lighting and other circuits of motor vehicles in which the liability of short circuits and overloads by excess current due to the widely varying speeds of the engine driven dynamo electric machine or varying conditions of the battery, is always present to a greater or less degree and frequently results in the impairment of the lamps or other translating devices commonly used in electric systems of this character.

The main object is to obviate as far as possible these objectionable results through the medium of a thermo-electric switch capable of maintaining a closed circuit through the lamps and other translating devices under normal conditions and also of automatically breaking the circuit in case of excess heat developed therein by an overload of current or short circuit.

Another object is to utilize a part of the same switch for automatically closing a normally open alternate circuit when the switch controlling the main circuit is opened.

Other objects and uses relating to specific parts of the switch and electric system in which it is connected will be brought out in the following description.

The drawing represents, diagrammatically, an electric lighting system including one form of my improved thermo-electric switch or circuit breaker adapted to be used in connection with motor vehicles and other electric systems.

In order that the function and operation of my invention may be easily understood and briefly described, I have shown a main circuit —1— and what may be termed an alternate circuit —2— to which current may be supplied by a battery —3—, dynamo electric machine (not shown) or by a dynamo and battery such as commonly employed in the dual ignition and lighting system of motor vehicles, it being deemed unnecessary to illustrate more than one source of current supply. For convenience of description, I have shown a pair of headlights —L— as connected in the main circuit —1— and a pair of sidelights —7— connected in the circuit —2— but it is to be understood that these circuits may contain any other translating devices such as are commonly used in motor vehicles, the branch circuit —2— being provided with a fuse cartridge —2'—.

The thermo-electric switch shown comprises a pair of coöperative contacts —4— and —5— forming the terminal ends of a pair of similar but reversely arranged supports —6— and —7— consisting, in this instance, of compound thermostatic bars bent in the form of spring coils and whose other ends are secured to relatively fixed members —8— and —9—, the latter being spaced some distance apart in parallelism so that contacts —4— and —5— may overlap one upon the other to normally close the circuit —1—.

The thermostatic bar —6— is composed of inner and outer layers —10— and —11— of material having different coefficients of expansion arranged so as to open or distend as the temperature thereof increases so that when heated to an excessive degree by an overload of current or by short circuit it would tend to move toward the position shown by dotted lines against a movable restoring stop —12—.

This thermostatic bar —6— including the terminal contact —4— is wholly connected in the main circuit —1— in series with the headlights —L— when in normal contact with the terminal —5— so that any excess heat which might develop therein will cause the withdrawal of its terminal —4— out of contact with the terminal —5— thereby breaking the main circuit and preventing impairment of the lamps or the discharge of the battery by short circuit.

The thermostatic bar —7— is also laminated but its layers as —10— and —11— are arranged in reverse order from those of bar —6— so as to cause the coil to contract or draw in toward the center as the temperature thereof increases, it being understood that the layers of this bar also have different coefficients of expansion, the outer layer being of substantially the same material as the inner layer of the bar —6— while its inner layer is of substantially the same material as the outer layer of bar —6—.

The thermostatic bar —6— is coiled in such a manner as to exert outward spring tension upon its free end while the thermostatic bar —7— is coiled in such a manner as to exert inward spring tension upon its free end —5— and when these contact terminals —4— and —5— are set in contact with each other to close the main circuit each will oppose the spring tension of the other and thus will be able to maintain such contact as long as the temperature of both bars is substantially the same.

It will be noted, however, that the thermostatic bar —7— is external to both circuits except as to its point of contact with the terminal —4— with the terminal —5— and therefore it is not affected by any excess current or short circuit which may develop heat in the other thermostatic bar —6— and can only be effected by the varying temperatures of the surrounding air to which the bar —6— is also exposed.

It is now clear that the contact terminals —4— and —5— not only oppose each other by the spring tension of their respective bars but also oppose each other by their expansive and contractile forces and it therefore follows, that as long as the temperature of both bars remain the same, as for example, under atmospheric temperatures, the contact members —4— and —5— will move together in unison and thereby keep the circuit closed.

On the other hand if the temperature of the bar —6— should materially exceed that of bar —7— by reason of a short circuit or excessive current in the circuit —1—, the resultant expansion of the bar —6— would cause its terminal —4— to be withdrawn from the contact terminal —5—, thus liberating the free ends of both bars and permitting them to move in opposite directions under their respective spring tensions.

This automatic separation of the terminals of the bars —6— and —7— is utilized to effect the closing of another circuit as for example the alternate circuit —2— through the side lamps —1— or other translating devices and for this purpose the circuit 2 is provided with a terminal —13— in the path of movement of the terminal —5— of the bar —7— so that as soon as the main circuit is broken in the manner described, the circuit 2 is closed by contact of the terminal —5— with the terminal —13— to automatically light the side lamps —1— in case the head lights should be cut out by short circuit.

This latter operation, although desirable in many instances to avoid accident by suddenly cutting out the headlights, is not absolutely necessary to the operation of the thermostatic switch, the primary function of which is to break the main circuit in case of short circuit or excess current which might impair the lamps or other translating devices.

What I claim is:

1. A thermo electric switch comprising in combination with an electric circuit, coöperative contacts in said circuit a thermostatic support for one of said contacts connected in the circuit, and a separate thermostatic support for the other contact external to said circuit, each support being arranged to oppose the movement of the other support under like temperatures and to cause the separation of the contacts when the temperature of the support in the circuit greatly exceeds that of the external support.

2. A thermo electric switch comprising in combination with an electric circuit, a pair of thermostatic bars having movable portions thereof normally contacting one with the other, one of said bars being connected in the circuit, the other bar being external to said circuit except as to its point of contact with the first named bar, said bars being normally tensioned to maintain contact one with the other under like temperatures and to cause their separation one from the other in case the temperature of the bar within the circuit sufficiently exceeds that of the external bar.

3. A thermo electric switch comprising in combination with an electric circuit, a pair of thermostatic bars secured at one end and having their free ends normally contacting one with the other, one of said bars being included on the circuit, the other bar being external to said circuit except as to its point of contact with the first named bar, said bars being normally tensioned to hold them in contact one with the other while their temperatures are substantially equal, and to allow them to separate one from the other when the temperature of the bar within the circuit sufficiently exceeds that of the external bar.

4. A thermo electric switch comprising in combination with an electric circuit, opposed thermostatic bars having normally contacting terminals spring tensioned each against the other, one of said bars being included in the circuit, the other bar being external to said circuit except as to its point of contact with the first named bar, the tension of said bars being normally adjusted to hold the terminals in contact under like temperatures of each bar and to allow the terminals to separate in case the temperature of the bar within the circuit sufficiently exceeds that of the external circuit.

5. In combination with a main circuit a contact terminal and a thermostatic bar normally contacting with said terminal but separable therefrom by the action of said bar under abnormal heat, another circuit contact, and a separate thermostatic bar carrying said terminal and spring tensioned to force its terminal into electrical connection with said contact when the first named bar is separated from said terminal for closing the second named circuit.

In witness whereof I have hereunto set my hand this 31st day of July, 1918.

ALBERT E. DOMAN.

Witnesses:
 H. E. CHASE,
 HOWARD P. DENISON.